US008823876B2

(12) United States Patent
Fukuda et al.

(10) Patent No.: US 8,823,876 B2
(45) Date of Patent: Sep. 2, 2014

(54) IMAGE PROCESSING APPARATUS

(71) Applicant: Hitachi Consumer Electronics Co., Ltd., Tokyo (JP)

(72) Inventors: Nobuhiro Fukuda, Tokyo (JP); Mitsuo Nakajima, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 13/875,767

(22) Filed: May 2, 2013

(65) Prior Publication Data
US 2014/0092307 A1  Apr. 3, 2014

(30) Foreign Application Priority Data

Sep. 28, 2012 (JP) ................. 2012-215489

(51) Int. Cl.
H04N 5/14 (2006.01)
H04N 5/64 (2006.01)
H04N 5/58 (2006.01)
H04N 5/21 (2006.01)

(52) U.S. Cl.
USPC ........... 348/571; 348/744; 348/602; 348/625; 348/658

(58) Field of Classification Search
CPC ............ H04N 5/14; H04N 5/20; H04N 5/21; H04N 5/44; H04N 9/646; H04N 7/26888; H04N 5/58; H04N 9/73; H04N 9/3182; H04N 9/68; H04N 5/66; H04N 5/142; H04N 9/3197; H04N 9/3129; H04N 9/31; G09F 2360/144; G09F 2320/0626; G09F 3/3406; G09F 2310/08
USPC ......... 348/571, 607, 606, 739, 744, 602, 603, 348/624, 625, 630, 658
IPC .................... H04N 5/14, 5/21, 5/58, 5/66, 5/64, H04N 9/73
See application file for complete search history.

(56) References Cited

U.S. PATENT DOCUMENTS

| 6,834,125 B2 | 12/2004 | Woodell et al. |
| 6,842,543 B2 | 1/2005 | Woodell et al. |
| 7,224,360 B2 * | 5/2007 | Tatsumi ........................ 348/142 |
| 7,869,724 B2 * | 1/2011 | Yamasaki et al. ............... 399/49 |
| 2010/0266214 A1 | 10/2010 | Jobson et al. |

FOREIGN PATENT DOCUMENTS

| JP | 2005-004506 A | 1/2005 |
| WO | 97/45809 A | 12/1997 |

* cited by examiner

Primary Examiner — Sherrie Hsia
(74) Attorney, Agent, or Firm — Volpe and Koenig, P.C.

(57) ABSTRACT

An image processing apparatus having an input unit for inputting an image signal and an image corrector for correcting the input image signal is disclosed. The image corrector is arranged to extract from the input image signal a specular reflection component and a diffuse reflection component and generate a corrected image signal based on a computation result with respect to these specular and diffuse reflection components thus extracted. This image corrector is adaptable for use in various types of image processors, including projectors, display devices and imaging devices.

10 Claims, 13 Drawing Sheets

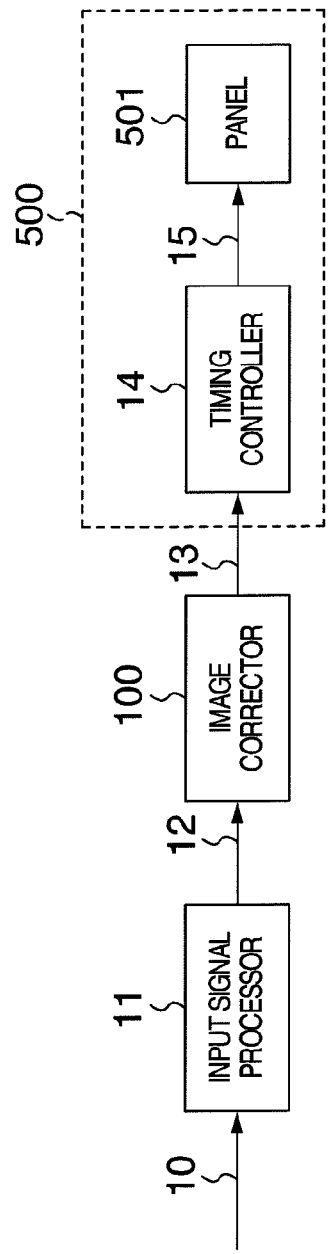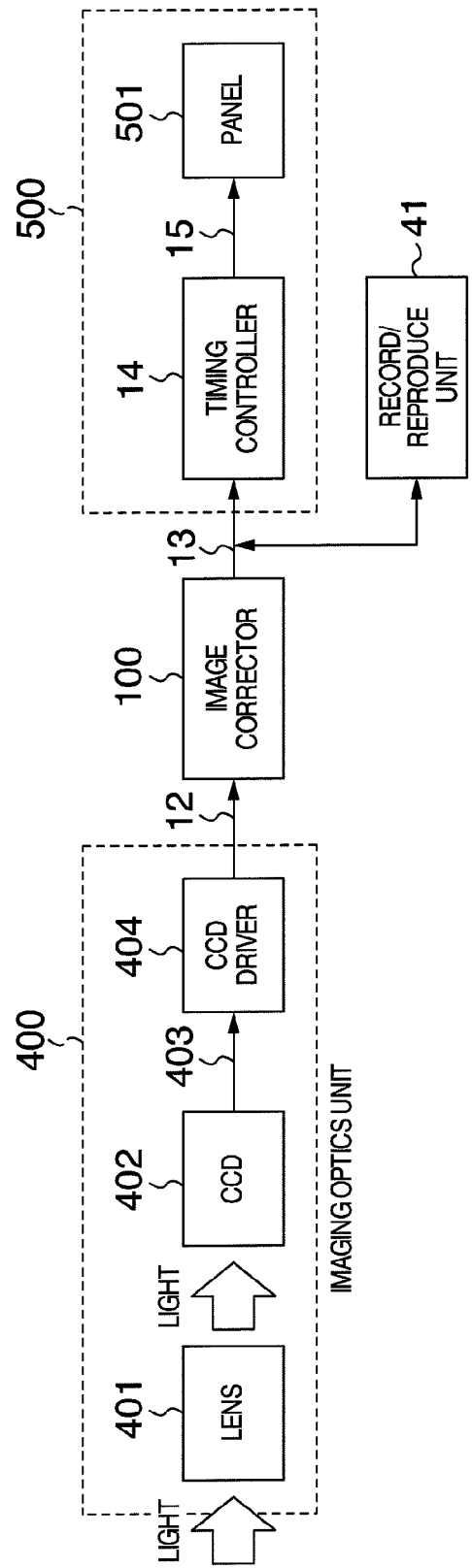

IMAGE PROCESSING APPARATUS

INCORPORATION BY REFERENCE

The present application claims priority from Japanese application JP2012-215489 filed on Sep. 28, 2012, the content of which is hereby incorporated by reference into this application.

BACKGROUND OF THE INVENTION

The present invention relates to image processing techniques. As the background art of this technical field, there is JP-A-2005-004506 (Patent Literature 1). This Patent Literature 1 contains in its Abstract a disclosure which reads as follows: To "provide an image processing program capable of excellent Multi-Scale Retinex processing without depending on the content of an original image to be processed," "in the Multi-Scale Retinex processing a composite blur image D6 is created by selecting on a per-pixel basis any one of a plurality of blur images D4-1 to D4-3 different in blur degree, which are generated from a plurality of scale-different periphery functions D3-1 to D3-3 in accordance with the pixel value level of an original image D2 to be processed. By letting a low-pass filter 410 apply filtering to the composite blur image D6, discontinuous generation of unnatural boarder is prevented, thereby performing the Retinex processing."

SUMMARY OF THE INVENTION

In the technique disclosed in Patent Literature 1, the contribution of an image to a plurality of scales has been taken into consideration; however, it fails to take account of the contribution to the nature of reflection. Thence, the processing result becomes uniform correction regardless of the material of an object in an image photographed. This poses a problem as to the deficiency in depiction of the texture of such object.

The present invention has been made in view of the above-stated problem, and an object of this invention is to provide a technique for performing more preferable image correction processing.

To attain the foregoing object, in accordance with one aspect of this invention, an apparatus is provided which includes an input unit for inputting an image signal and an image corrector for correcting the input image signal. The image corrector is arranged to extract from the input image signal a specular reflection component and a diffuse reflection component and generate a corrected image signal based on an arithmetic operation result with respect to the specular and diffuse reflection components thus extracted.

According to this invention, it becomes possible to perform more preferable image correction processing.

BRIEF DESCRIPTION OF THE DRAWINGS

FIG. 13 is a diagram showing a configuration of another image processing apparatus embodying the invention (Embodiment 3).

FIG. 14 is a diagram showing a configuration of still another image processing apparatus embodying the invention (Embodiment 4).

DESCRIPTION OF THE EMBODIMENTS

Figure 1:
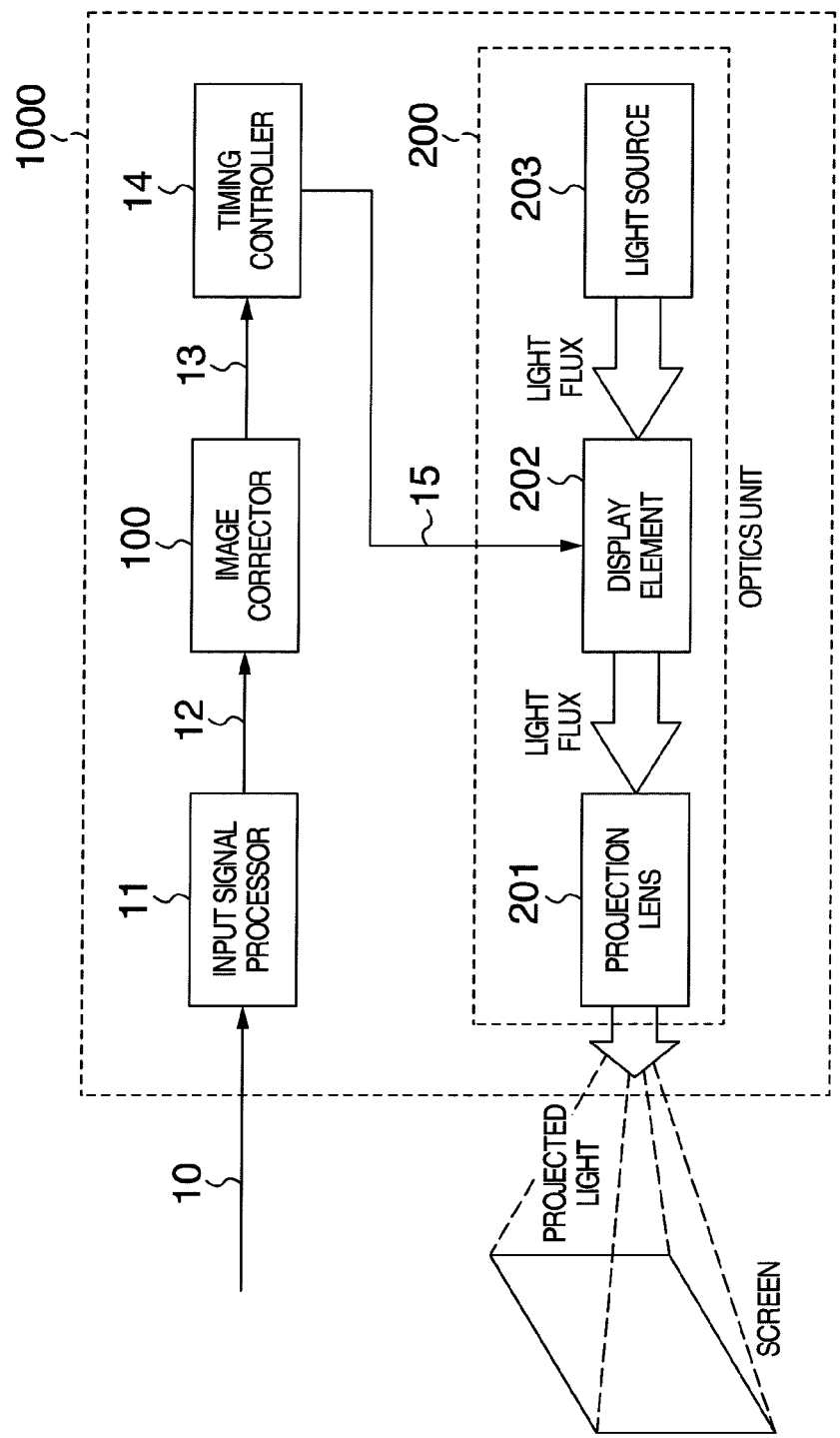
FIG. 1 is a diagram showing one exemplary configuration of an image processing apparatus embodying this invention (Embodiment 1).

Although illustrative embodiments of the present invention will be described with reference to the accompanying figures of the drawing below, this invention should not be limited only to these embodiments. In respective drawings for explanation of embodiments, the same parts or members are designated by the same reference numerals, and repetitive explanations thereof are eliminated.

Embodiment 1

In this embodiment, an image projector will be explained as an example of image processing apparatus embodying the invention for performing image correction by decomposing an image per reflection nature of light.

FIG. 1 shows an exemplary configuration of image processing apparatus 1000 (projector) having image processing functionality in accordance with one embodiment of this invention.

This image processing apparatus includes an input signal processing unit 11 which receives an input image signal 10 and converts it into an internal image signal 12 by using a compressed video/image signal decoder, interlace/progressive (IP) conversion, scaler and others, an image correcting unit 100 which inputs the internal image signal 12, a timing controller 14 which inputs a corrected image signal 13 and treats this signal to generate a display control signal 15 based on horizontal/vertical sync signals of a display screen, and an optical system unit 200 for visually displaying images.

The optics unit 200 includes a light source 203 which emits luminous flux, a display element 202 which is controlled by the display control signal 15 to generate an image by adjusting the gradation or "tone" of the light flux from light source 203 on a per-pixel basis, and a projection lens 201 for outputting to a screen or the like those light rays passing through or reflected from the display element 202. In an optical path between the light source 203 and display element 202 and a light path between the display element 202 and projection lens 201, optical elements are disposed which are needed according to specifications on a case-by-case basis, such as lenses, mirrors, optical filters and others. Examples of the display element 202 include, but not limited to, a digital mirror device (DMD) for reflecting the light from the light source, a reflective liquid crystal (LC) element for reflecting the light from the light source, and a transmissive LC element for permitting transmission of the light from light source. The display element 202 is not required to be a single element; it may alternatively be arranged by a plurality of elements, in which are provided those elements corresponding to multiple light colors (e.g., three primary colors of red, green, blue) respectively.

The image corrector 100 is configured from a reflected light detection unit 150 which receives the internal image signal 12 as its input signal and performs image processing based on the retinex theory to thereby detect two kinds of reflected light components 101 and 102, and a reflected light controller 180 which inputs the two reflected light components detected and performs, after adjustment of reflected light, recomposition or "resynthesis" to thereby output a corrected image signal 13.

Prior to explaining configurations of the reflected light detector 150 and reflected light controller 180, traditional retinex theory-based image correction processing will be explained. It should be noted that the processing to be discussed here is for comparison with the processing of this embodiment, and has no direct relation to the image correction processing of this embodiment except for those parts to be referred from the explanation of the image correction processing of this embodiment.

According to the retinex theory, an image I is represented by a product of illumination light L and reflectivity r; so, it is given as I=L·r. Assume here that a local illumination light component complies with a Gaussian distribution. In the center/surround (C/S) retinex which is the retinex for extraction of reflected light components, the reflected light R of a logarithmic space is obtained from a difference between the Gaussian distribution in the logarithmic space and the pixel of interest in an image under an assumption that L follows the Gaussian distribution with this pixel as its center point. Here, letting the luminance value of the pixel of interest be I(x,y) and letting the gaussian be F(x,y), the following equation is given.

$$R(x,y) = \log I(x,y) - \log [F(x,y) \otimes I(x,y)] \quad \text{(Equation 1)}$$

In Equation 1, the Gaussian distribution of dispersion δ with the origin in a two-dimensional (2D) space being as its center point is given by the following equation.

$$\text{Gauss}(x, y, \sigma) = \frac{1}{\sqrt{2\pi}\,\sigma} e^{-\frac{x^2+y^2}{2\sigma^2}} \quad \text{(Equation 2)}$$

Figure 8A:
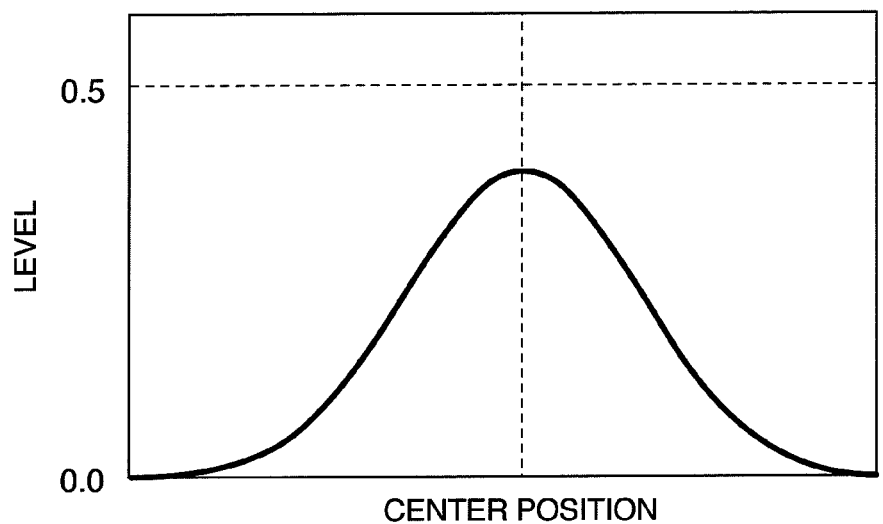
FIG. 8A is a diagram graphically showing a Gaussian distribution.

FIG. 8A is a graph showing a curve of Gaussian distribution, with its vertical axis indicating a luminance level and with transverse axis indicating one-dimensional (1D) position coordinate system. From this graph, it can be seen that the luminance level decreases with an increase in distance from the center point.

A product of F(x,y) and I(x,y) is called the convolution product, which is given by the following equation.

$$f(x, y) \otimes g(x, y) \equiv \int_\Omega \int f(\sigma, \tau) g(x-\sigma, y-\tau) d\sigma d\tau \approx \quad \text{(Equation 3)}$$
$$\sum_{s=-L}^{L} \sum_{i=-L}^{L} f(s, t) g(x-s, y-t)$$

Note here that a model represented by a single scale as in Equation 1 is called the single-scale retinex (SSR) model; a model represented by a plurality of scales is called the multi-scale retinex (MSR) model. The SSR is a model for extracting a reflected light luminance component relative to one scale from within an image. The MSR is an extended version of SSR model, which is for extracting from within the image those reflected light luminance components with respect to a plurality of scales. Supposing here that the i-th SSR's reflected light component is synthesized by a weight W, the MSR with N scales (where N is a positive integer) is given by the following equation.

$$R_{SSR,i}(x, y) = \log I(x, y) - \log[F_i(x, y) \otimes I(x, y)] \quad \text{(Equation 4)}$$
$$R_{MSR}(x, y) = \sum_{i=1}^{n} W_i R_{SSR,i}(x, y)$$

Figure 2:
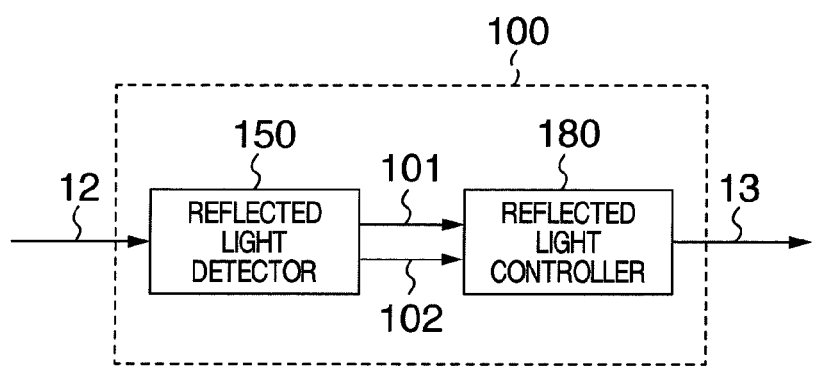
FIG. 2 is a diagram showing a configuration of processing of an image corrector used in the apparatus.
Figure 6:
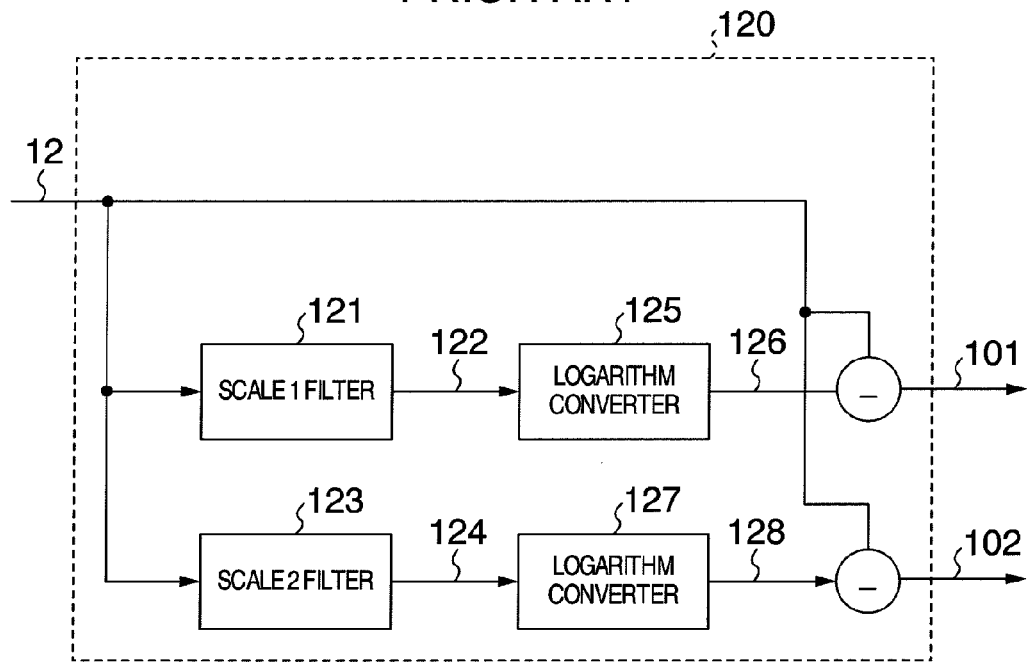
FIG. 6 is a diagram showing a configuration of prior art reflected light detector.
Figure 7:
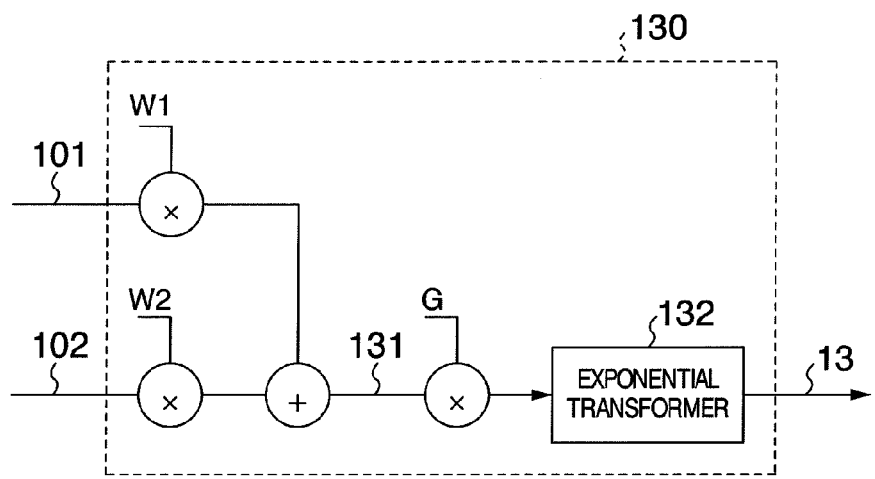
FIG. 7 is a diagram showing a configuration of prior art reflected light controller.

Equation 4 will be explained using FIGS. 6 and 7. For purposes of brevity, there is considered the case of N=2, that is, the case of MSR consisting of two SSRs. FIGS. 6-7 are diagrams for explanation of a configuration which uses prior known retinex theory-based image correction processing to convert an input image signal 12B into a corrected image signal 13B. The configuration explained here is merely for comparison with that of this embodiment, which has no direct relation with the embodiment configuration shown in FIGS. 1-2.

FIG. 6 is a diagram showing a configuration of a functional unit 120 which detects reflected light of MSR. The reflected light detector 120 is constituted from a couple of SSRs. More specifically, this detector includes a filter 121 with first scale, a filter 123 with second scale, and logarithmic converters 125 and 127 connected to the filters respectively.

The filter 121 with scale #1 outputs a processing result signal which is obtained by applying computation using the convolution multiplication represented by Equation 3 to an image signal 12B of an object to be processed. The logarithm converter 125 applies logarithmic conversion to a convolution multiplication result signal 122. A logarithmically converted signal 126 is subjected to calculation of a difference of it from the original image signal, thereby outputting a reflected light component 101B based on the first scale. This is the SSR reflected light component in the case of i=1 in Equation 4.

The filter 123 with scale #2 outputs a signal 124 indicative of a result of processing for applying to the image signal 12B the convolution multiplication with its scale different from that of the first scale filter 121—i.e., a scale larger than the first scale. The logarithm converter 127 applies logarithmic conversion to the convolution multiplication result signal 124. A logarithmic converted signal 128 is subject to calculation of a difference from the original image signal, thereby outputting a second-scale reflected light component 102B. This is the SSR reflection component in the case of i=2 in Equation 4.

FIG. 7 is an explanation diagram of the processing of MSR reflected light controller 130, which generates a corrected image signal 13B by using the reflected light components 101B and 102B as output from the reflection detector 120 of FIG. 6. This reflected light controller 130 may be arranged by weighted average using weights W1 and W2 or, alternatively, by use of an exponential converter 132 along with the W1/W2-weighted average and gain G. Although it is an ordinary way to let the former be a result of MSR in many cases, the latter—i.e., the so-called homomorphic filtering result—is specifically used in this embodiment. The gain G may be varied depending upon the format of an image signal 10 being input to the input signal processor 11 and/or the kind of image contents, for example.

The reflected light components 101 and 102 are subjected to weighted averaging using W1 and W2, thereby generating reflected light 131 in the logarithmic space. Namely, this is Equation 4 of widely-used MSR which is represented by weighted average of SSRs. Here, image adjustment is applied by Equation 4 to the signal 131 at gain G. Then, at the logarithm converter 132, the logarithmic luminance space is returned to a linear luminance space, resulting in reflected light r being obtained.

With the prior art retinex theory-based image correction processing, it is possible to remove the influence of illumination light components by use of MSR, thereby extracting reflected light components. However, with this prior art technique for enhancing the performance of dynamic range compression by simply adjusting a plurality of scales as in the case of this MSR, any contribution to reflection natures is not taken into consideration although consideration is given to the contribution of an image to multiple scales. Therefore, the result is mere uniform correction irrespective of the material of an object in such image. Next, reflected light detecting and controlling units used to perform the image processing of this embodiment will be explained. In the image processing of this embodiment, reflected light is handled on the basis of a principal concept as set forth below.

Reflection of light is categorized by its nature into several kinds of light, such as light that exhibits specular reflection at a mirror-like smooth surface (referred to hereinafter as the specular component or, more simply, "specular"), light that exhibits non-specular or diffuse reflection due to the existence of fine unevenness of a rough surface (referred to as the diffuse component or "diffuse"), and environmental light (called the ambient light or "ambient") which is the scattered light resulting from repeated execution of reflections with respect to its surrounding environment.

For instance, in the field of three-dimensional (3D) computer graphics, a Phong reflection model is known as one of reflection modes for representing shades of an object surface by using the above-stated three light natures. With the Phong reflection model, the quality of material is representable by the reflective behavior of light.

For example, when a spotlight is irradiated onto a spherical body made of plastic resin, a small circular highlight with increased brightness is formed thereon. A rubber-like sphere is greater in radius of highlight than the plastic one but less in brightness. This highlight part is the specular reflection. The diffuse reflection and ambient light also differ in luminance depending on materials used.

In view of the above, the invention as disclosed herein provides a high-quality image correction processing technique for decomposing an image with respect to each light reflection nature during extraction of reflected light components and for changing correction methodology in a way pursuant to each nature, thereby causing the quality of materials of shooting objects in an image to be factored into calculations. For example, image correction processing is provided which takes into account the material of an object by decomposing its image into specular reflection, diffuse reflection and ambient light components during reflected light component extraction and by performing adjustment in such a way as to strongly adjust the specular reflection component of glossy metal and glass surfaces while weakly adjusting the specular reflection part of rubber and clay surfaces.

Figure 5:
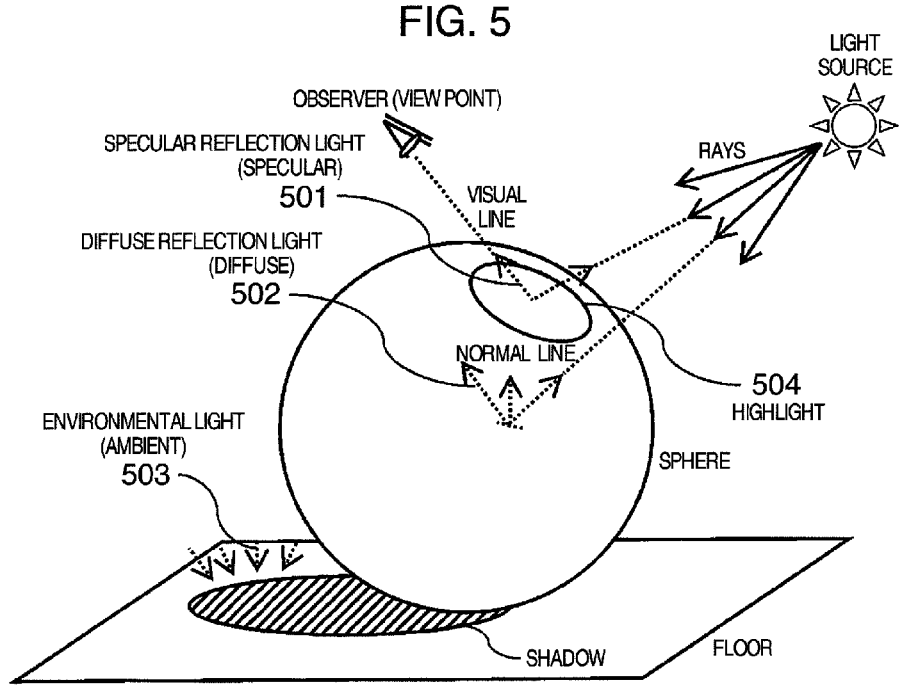
FIG. 5 is a diagram for explanation of the nature of reflected light by means of a Phong reflection model.

FIG. 5 is a diagram showing an example of the Phong reflection model. This model consists essentially of a light source, light rays emitted from this light source, a sphere at which these light rays are arrived, a floor with the sphere mounted thereon, and an observer who is watching the sphere. Observation is performed at a position of viewing point, by the naked eye or by using observation equipment, such as a camera or the like.

In FIG. 5, the specular reflection component is light 501 which is reflected from a surface of the sphere—i.e., target object being imaged—to a direction along the line of sight. This is the one that the light source is imaged on the sphere surface, wherein a circular highlight 504 shown in FIG. 5 is the range of such specular reflection part. In the case of a plastic sphere for example, a small round highlight with increased brightness is formed. In the case of a rubber sphere, the highlight becomes larger in radius than that of the plastic one but lower in brightness. The Phong reflection model is under an assumption that the specular reflection part follows a powered value of cosine of the sight line and reflected light.

In FIG. 5, the diffuse reflection component is light 502 that strikes a surface of the sphere and then performs diffuse reflection. The luminance of this diffuse part is determined by directions of the light and sphere surface, i.e., the cosine of the light and normal line; thus, a portion at which the light directly hits the sphere surface is the range of diffuse reflection.

In FIG. 5 the ambient light is light 503 that enters the sphere's shadow on the floor. This is an accumulation of light rays which have reflected many times and scattered around the sphere and which are averaged in an entire environment. So, even the shadow part with no direct arrival of light has a certain level of luminance.

From the foregoing, the Phong reflection model is given by the following equation.

$$I = k_d \sum_{j=1}^{l} (\vec{N} \cdot \vec{L}) m_d + k_s \sum_{j=1}^{l} (\vec{R} \cdot \vec{V})^n I_j + I_a \quad \text{(Equation 5)}$$

Consequently, the reflected light at the reflected light detector of this embodiment is assumed to consist of ambient light and diffuse and specular reflection components. Suppose that the ambient light in an image complies with a wide-scale Gaussian distribution, that the diffuse reflection part follows a cosine luminance distribution, and that the specular reflection part obeys a powered-cosine luminance distribution. Letting a filter of the ambient light be Fa(x,y), a filter of the diffuse reflection part be Fd(x,y) and a filter of specular reflection part be Fs(x,y), respective filters are defined by the following equations.

$$F_a(x, y) = \frac{1}{\sqrt{2\pi}\,\sigma} e^{-\frac{x^2+y^2}{2\sigma^2}} \quad \text{(Equation 6)}$$

$$F_d(x, y) = \cos\left(\frac{\pi\sqrt{x^2 + y^2}}{k}\right) / N \quad \text{(Equation 7)}$$

$$F_s(x, y) = \cos^n\left(\frac{\pi\sqrt{x^2 + y^2}}{k}\right) / N^n \quad \text{(Equation 8)}$$

Figure 8B:
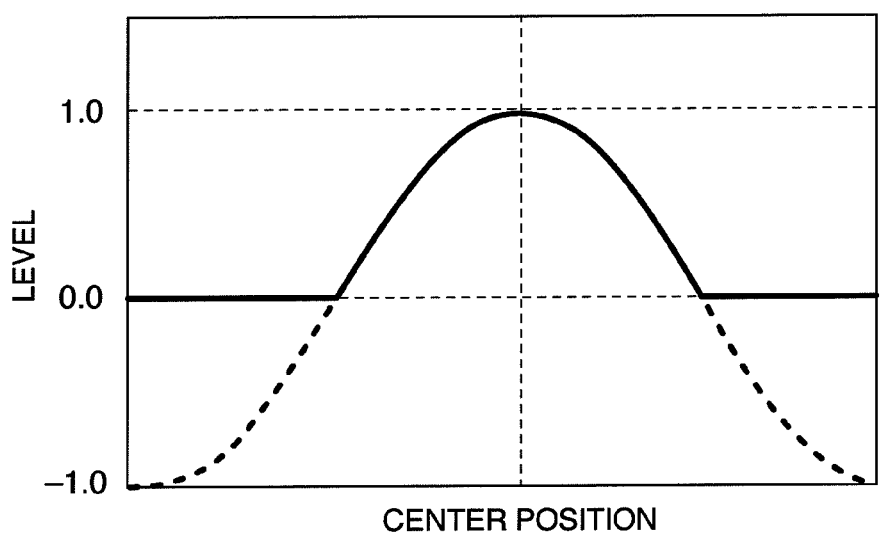
FIG. 8B is a graph showing a cosine-based luminance distribution.
Figure 8C:
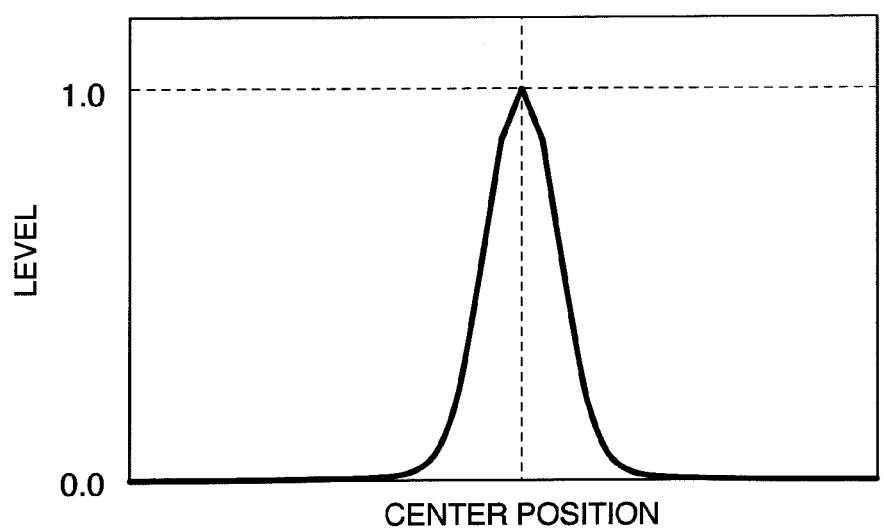
FIG. 8C is a graph showing a powered-cosine luminance distribution.

FIGS. 8A to 8C are graphs showing distribution curves of the ambient light, diffuse and specular reflection components, the vertical axis of each graph representing a luminance level and the transverse axis indicating one-dimensional position coordinate. As apparent from these graphs, the diffuse and specular reflection distributions are greater in steepness of level drop-down than the Gaussian distribution of the ambient light.

Note here that a filtering-processed image Ia of the ambient light almost consists of ambient components due to averaging of its entirety. A filtered image Id of the diffuse reflection part almost contains only ambient and diffuse components because specular reflection components are averaged by the filter. A filtered image Is of the specular reflection is such that all of the ambient, diffuse and specular reflection components remain therein because the image is hardly subjected to the averaging. This is given as Equation 9 below.

$$\text{Ambient}=I_a, \text{Diffuse}=I_d-I_a, \text{Specular}=I_s-I_d \quad \text{(Equation 9)}$$

Using this, logarithmic-space reflection components are calculated in a similar way to MSR, a result of which is given by Equation 10 below.

$$R_{Phong,i}(x,y)=W_d R_{Diffuse,i}(x,y)+W_s R_{Specular,i}(x,y)$$

$$R_{Specular,i}(x,y)=\log \bar{I}_{s,i}(x,y)-\log \bar{I}_{d,i}(x,y)=\log [F_s(x,y) \otimes I(x,y)]-\log [F_d(x,y) \otimes I(x,y)]$$

$$R_{Diffuse,i}(x,y)=\log \bar{I}_{d,i}(x,y)-\log \bar{I}_{a,i}(x,y)=\log [F_d(x,y) \otimes I(x,y)]-\log [F_a(x,y) \otimes I(x,y)] \quad \text{(Equation 10)}$$

Specular reflection of mirrors and metals or the like are considered to be total reflection; so, a powered cosine value becomes infinite. At this time, the specular reflection component may also be represented by Equation 11 below.

$$R_{Specular,i}(x,y)=\log I(x,y)-\log [F_d(x,y) \otimes I(x,y)]=\log I_i(x,y)-\log \bar{I}_{d,i}(x,y) \quad \text{(Equation 11)}$$

As the ambient light is average light of the entire environment, either an average value filter or an average luminance filter may be used in place of Gaussian filter. For example, when using the average luminance, Equation 12 is given.

$$R_{Diffuse,i}(x,y)=\log \bar{I}_{d,i}(x,y)-\log [\Sigma I(x,y)/num]=\log \bar{I}_{d,i}(x,y)-\log \bar{I}_{o,i}(x,y) \quad \text{(Equation 12)}$$

Figure 9A:
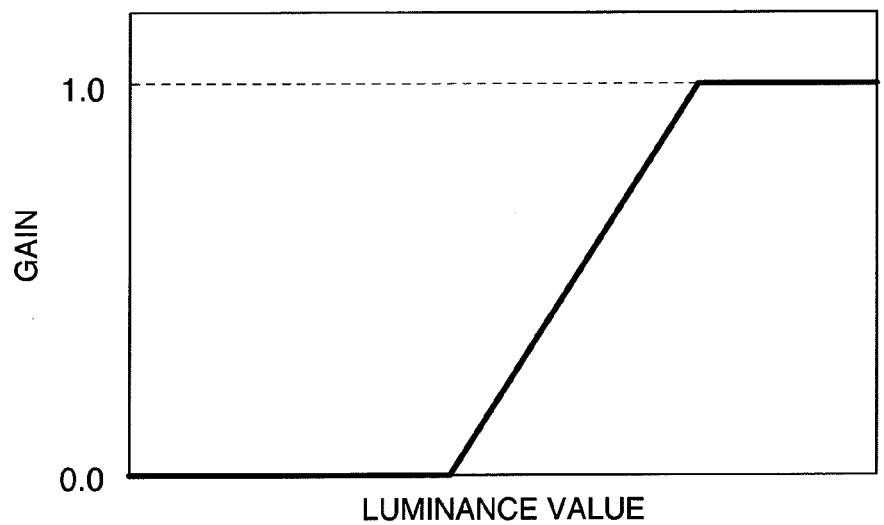
FIG. 9A is a graph showing a plot of specular correction gain versus luminance value of image.
Figure 9B:
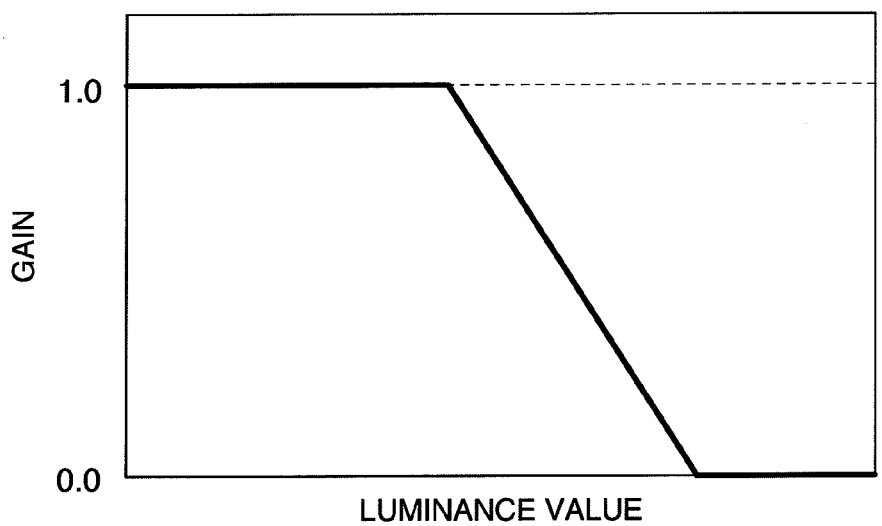
FIG. 9B is a graph showing a plot of diffuse correction gain versus image luminance value.

In many cases, the specular reflection is highly visible since it is a highlight with high luminance; the diffuse reflection is of middle or low luminance. In view of this, for example, the gain of a high-luminance region such as shown in FIG. 9A may be added to the specular part $R_{specular}$ of Equation 10 whereas the gain of a middle/low-luminance region shown in FIG. 9B may be added to the diffuse part $R_{Diffuse}$. Here, letting an input/output curve of FIG. 9A be g(I), the gain becomes zero (0) when the input luminance I is low. The gain gradually increases from a middle level of luminance. At a high luminance level, the gain is equal to one (1). An input/output curve of FIG. 9B is 1−g(I): when the luminance is low, the gain is 1; the gain gradually decreases from a middle luminance level; the gain becomes 0 at high luminance level.

In a similar manner to the example of MSR, Equation 10 defines the operation of a homomorphic filter by addition of the gain and exponential function after execution of the weighted averaging. For this homomorphic filter, the logarithmic and exponential functions may be approximated by a power-used function and its inverse function, for example. In this case, when letting it be function f, Equation 13 is given.

$$R_{Phong,i}(x,y)=W_d R_{Diffuse,i}(x,y)+W_s R_{Specular,i}(x,y)$$

$$R_{Specular,i}(x,y)=f(F_s(x,y) \otimes I(x,y))-f(F_d(x,y) \otimes I(x,y))=f(\bar{I}_{s,i}(x,y))-f(\bar{I}_{d,i}(x,y))$$

$$R_{Diffuse,i}(x,y)=f(F_d(x,y) \otimes I(x,y))-f(F_a(x,y) \otimes I(x,y))=f(\bar{I}_{d,i}(x,y))-f(\bar{I}_{a,i}(x,y)) \quad \text{(Equation 13)}$$

By performing the above-stated processing, it is possible in the image processing of this embodiment to perform correction with the nature of reflection being taken into consideration. More specifically, unlike the image processing that handles reflected light by mere use of a plurality of different scales, the image processing of this embodiment is specifically arranged to separate a plurality of nature-different reflection components respectively and then perform image processing which factors their natures into calculations. With this arrangement, it is possible to more preferably represent the texture of the material of an object in the image.

An arrangement for realizing the above-stated image processing will be explained using FIGS. 3 and 4.

Figure 3:
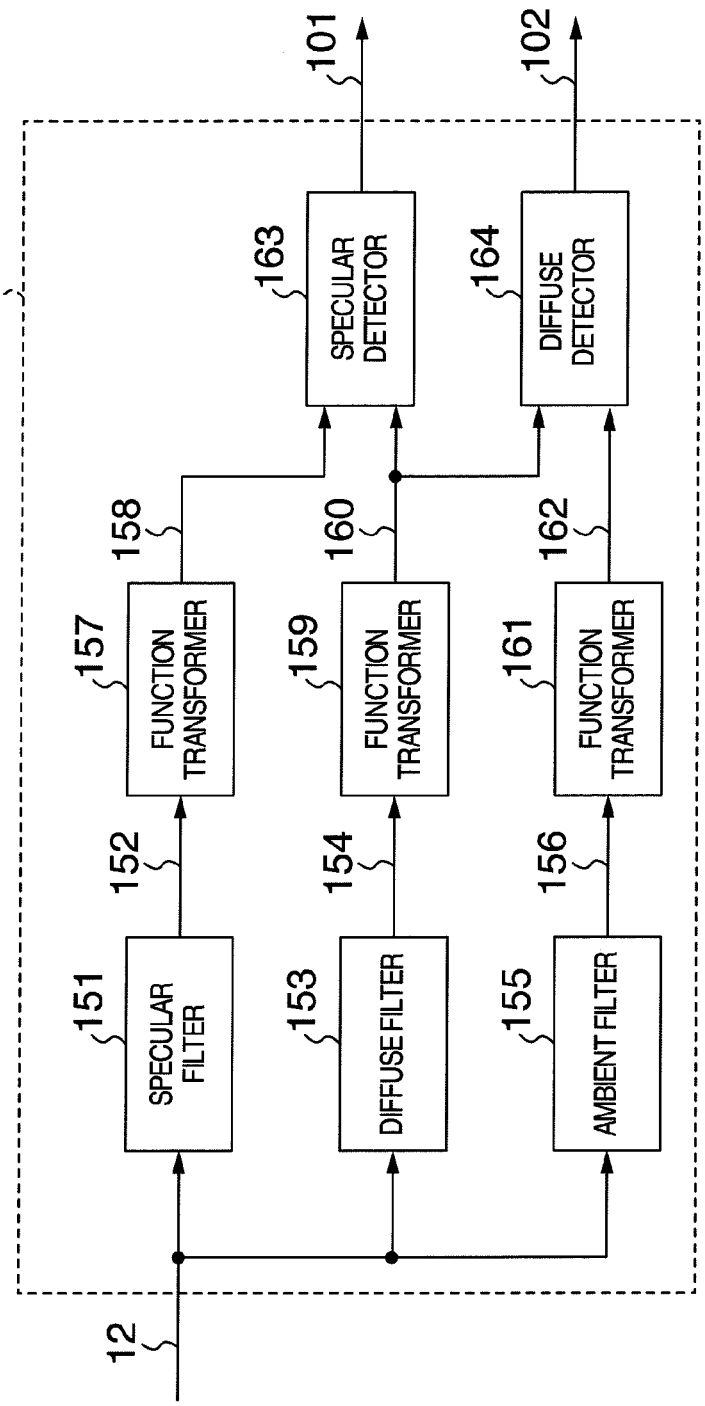
FIG. 3 is a diagram showing a configuration of a reflected light detection unit in the image corrector unit.

FIG. 3 is a diagram showing a configuration of the reflected light detection unit 150 in accordance with Embodiment 1. The reflected light detector 150 includes a specular reflection filter 151, diffuse filter 153, ambient light filter 155, function transformers 157, 159 and 161, specular reflection detection unit 163, and diffuse detection unit 164. The specular filter 151 performs filtering processing defined by Equation 8, for example. The diffuse filter 153 performs filtering processing shown by Equation 7 for example. The ambient filter 155 performs filtering shown by Equation 6. Next, by using reflected light components that are function-transformed by the function transformers 157, 159, 161, the specular reflection detector 163 detects $R_{Specular}$ in Equation 10. At this time, as stated previously, the arrangement for detecting $R_{Specular}$ of Equation 11 may be employed if needed. Additionally the diffuse detector 164 calculates $R_{Diffuse}$ of Equation 10 in a similar way. Regarding the ambient light component, in case the ambient filter 155 is designed to use an average-value filter or average luminance in place of Gaussian filter as stated above, the component $R_{Diffuse}$ to be detected by the diffuse detector 164 is given by Equation 12. Note that the function transformers may be arranged to use logarithm functions as indicated by the equation above or, alternatively, may be designed to approximate by power functions.

Figure 4A:
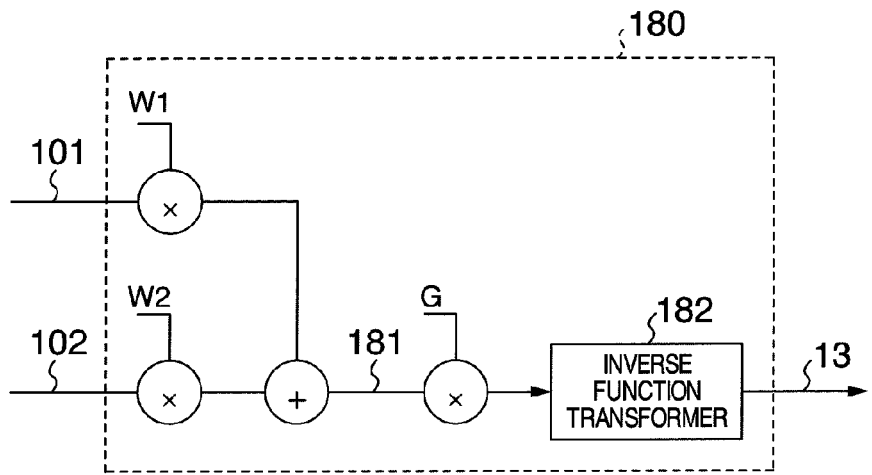
FIG. 4A is a diagram showing a configuration of a reflected light controller used in the image corrector; and, FIG. 4B is a diagram showing a configuration of a reflected light controller with luminance characteristics being added thereto.

FIG. 4A shows a configuration of the reflected light controller 180 in Embodiment 1. The reflected light controller 180 includes arithmetic operational parts for performing weighted averaging using weights W1 and W2. This weighted averaging is the processing corresponding to the computation processing of $R_{Phong}$ of Equation 10. An output of the reflected light controller 180 is supplied to an inverse function transformer 182, which performs transformation processing using the inverse function of the function used in the function transformer whereby reflected light r is obtained. In the image processing apparatus of this embodiment, this reflected light r is output as a corrected image signal I3. As shown in FIG. 4A, the gain G may be provided to perform gain adjustment.

This gain G may be changed depending, for example, on the format of image signal 10 as input to the input signal processor 11 and the kind of video/image contents.

Figure 4B:
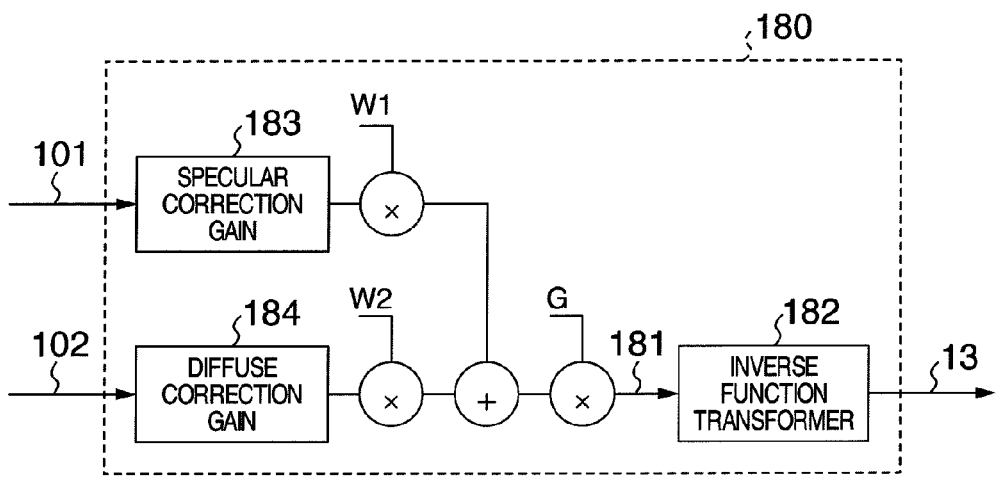

Alternatively, as shown in FIG. 4B, the configuration of FIG. 4A may be modified to further include a specular correction gain 183 having a high gain in the high luminance region of FIG. 9A and a diffuse correction gain 184 having a high gain in the middle/low luminance region of FIG. 9B.

With the arrangement stated above, in the process of extracting reflected light components, processing is performed for decomposing or "disassembling" an image into several kinds of components with different light reflection natures, i.e., specular reflection, diffuse reflection and ambient light components, and for varying the degree of correction in a way pursuant to respective natures, thereby providing image correction processing that takes account of the material of an object in such image.

Therefore, according to the above-stated image processing apparatus of Embodiment 1 of this invention, when extracting reflection components of incoming light, an image is decomposed into parts with different light reflection natures, and correction methodology is changed as appropriate according to respective natures. This makes it possible to perform high-quality image correction processing with the material of an object in the image being taken into consideration. In other words, it becomes possible to perform image correction processing with enhanced graphical rendering capability superior to prior art techniques.

Embodiment 2

In Embodiment 1, an example of the image processing apparatus that performs image correction after having decomposed an image into parts having different light reflection natures. In Embodiment 2, adaptive control based on in-image noises and/or outside light will be described as one application example of this invention.

Figure 10:
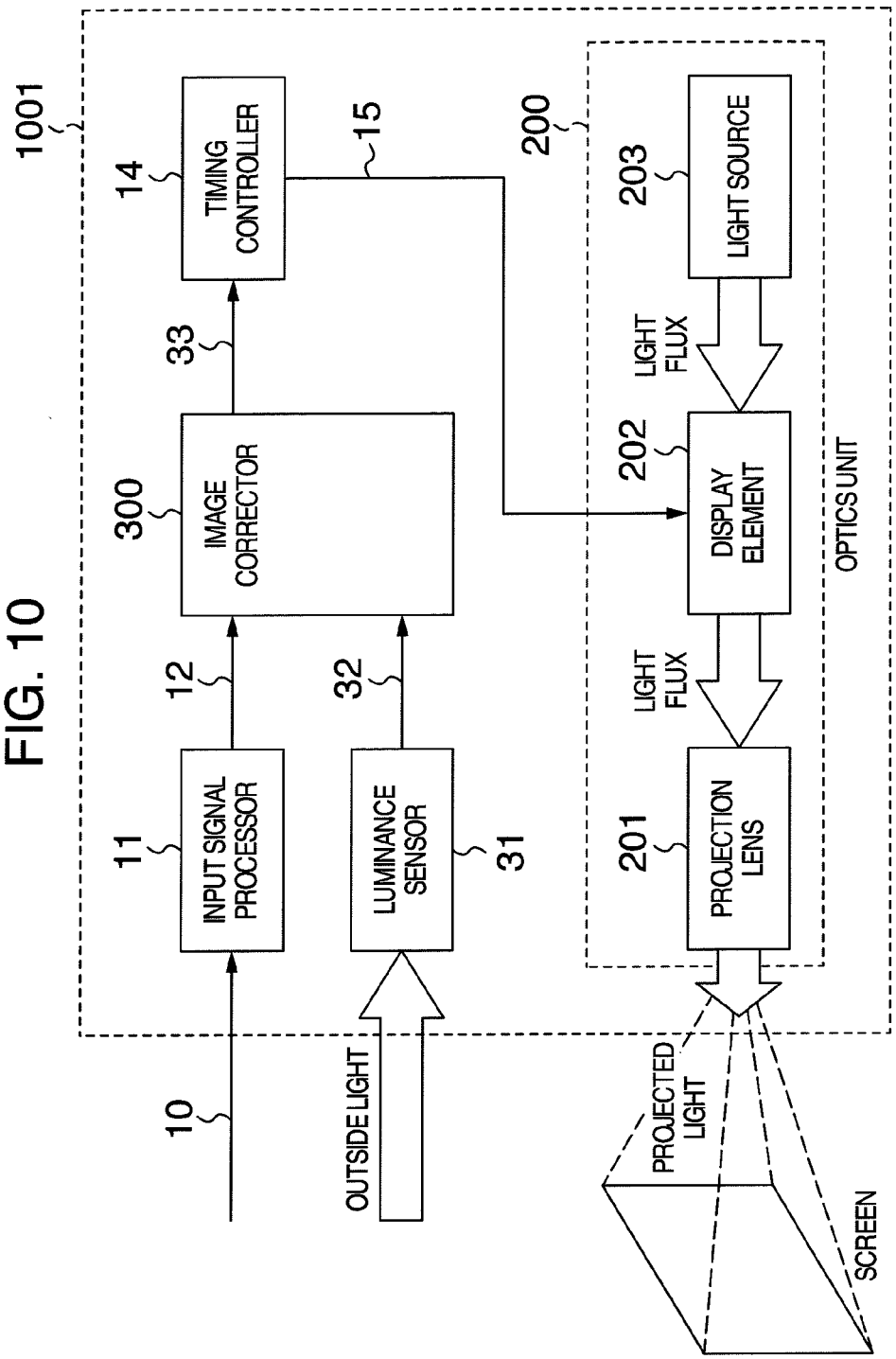
FIG. 10 is a diagram showing a configuration of an image processing apparatus also embodying the invention (Embodiment 2).

FIG. 10 shows an exemplary configuration of image processing apparatus 1001 (projector) of this embodiment. Parts or elements designated by the same reference numerals as those used in FIG. 1 are the ones that have the same functions and configurations as those of FIG. 1. Operations and configurations of these elements are as explained in Embodiment 1; so, detailed explanations will be eliminated herein.

This image processing apparatus has an input signal processing unit 11 which receives at its input an image signal 10 and converts it into an internal image signal 12 by means of a compressed image signal decoder, IP conversion, scaler or the like for example, a luminance sensor 31 which inputs outside light and outputs a luminance level signal 32 having 256 level steps as an example, an image corrector 300 which inputs the internal image signal 12 and luminance level signal 32, a timing controller 14 which inputs a corrected image signal 33 and processes the corrected image signal to generate a display control signal 15 based on horizontal/vertical sync signals of a display screen, and an optics unit 200 including a display element 202 for displaying images, a light source 203 and a projection lens 201.

Figure 11:
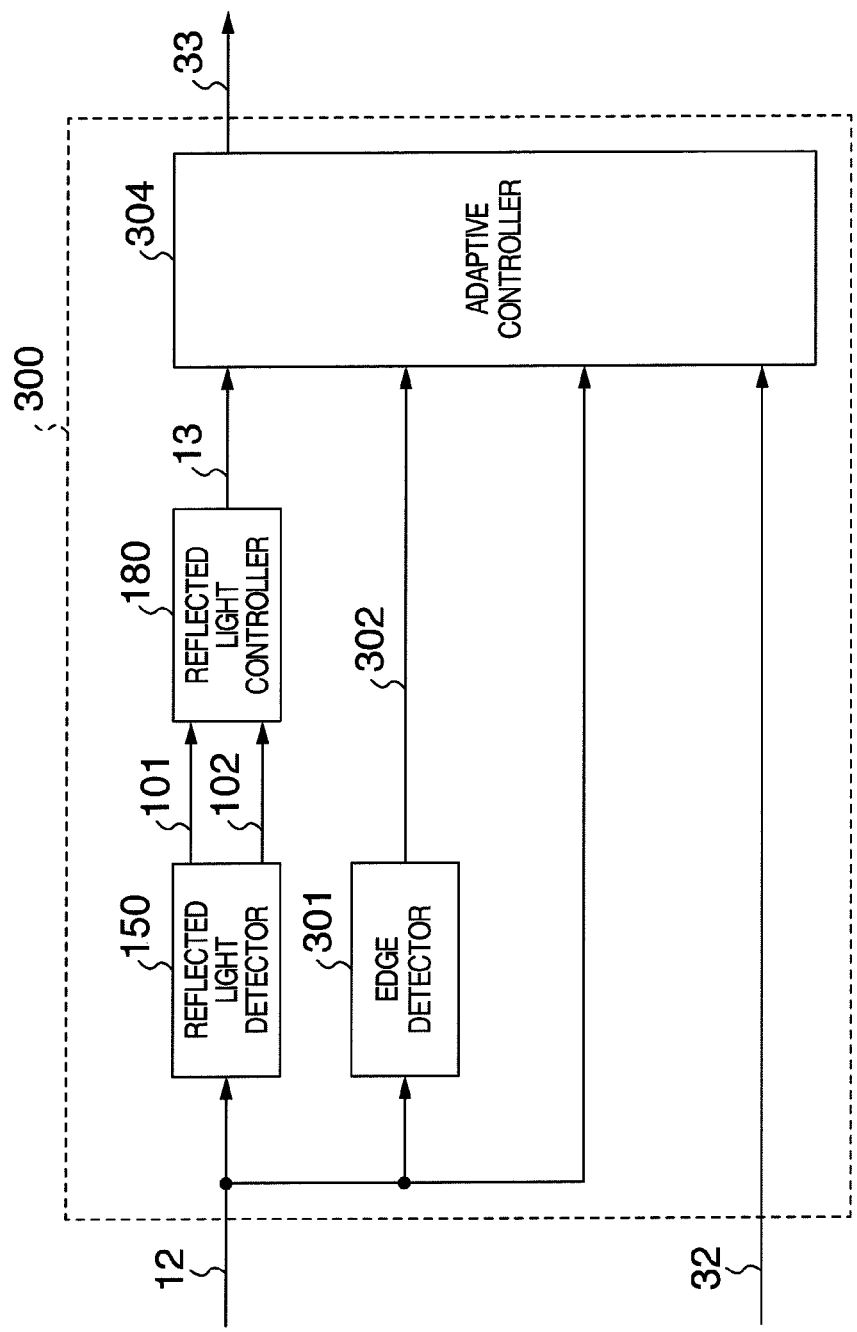
FIG. 11 is a diagram showing a configuration of an image corrector unit in the apparatus of FIG. 10, for explanation of an example of adaptive control based on noises and outside light.

A configuration of the image corrector 300 of this embodiment will be explained with reference to FIG. 11. This image corrector 300 is made up of a reflected light detector 150 which inputs the internal image signal 12 and detects two kinds of reflected light components 101-102, a reflected light controller 180 which inputs these detected light components and performs adjustment and recomposition to thereby output a corrected image signal 13, an edge detector 301 which inputs the corrected image signal 12 and outputs an edge signal 302, and an adaptive controller 304 which inputs the corrected image signal 13, edge signal 302, internal image signal 12 and luminance level signal 32 and performs adaptive control using the luminance level and edge signal.

The edge detector 301 operates, for example, to determine an edge amount which is set at a value of addition of the absolute value of a difference between a target pixel and its neighboring pixel for a number of times corresponding to neighboring pixels. In this case, a high-frequency region resembling small-amplitude granular noises becomes smaller in edge amount. Consequently, in this case, an attempt may be made to deactivate the correction. With this approach, it is possible to avoid undesired enhancement of noises.

Figure 12:
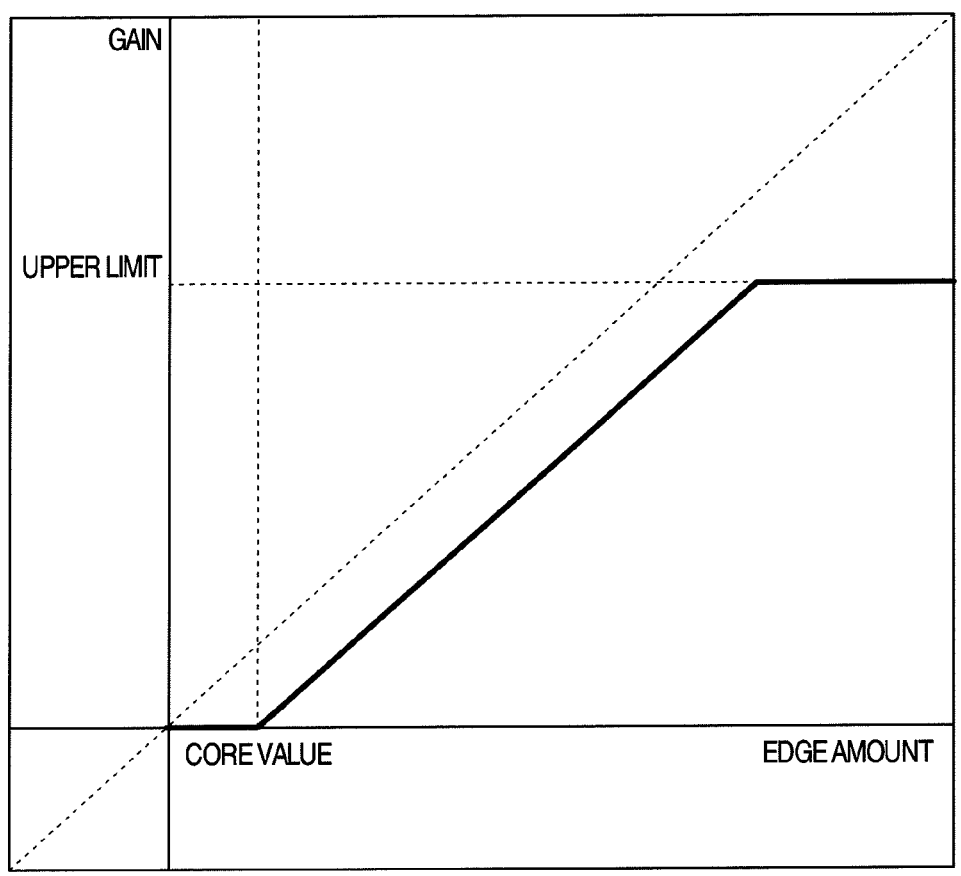
FIG. 12 is a graph showing a relationship of edge amount and gain.

FIG. 12 is a graph showing a relationship of edge amount and gain for correction value control, wherein the edge amount is plotted in the transverse axis whereas the gain is in the vertical axis. As shown, the gain stays at zero within a region up to a certain edge amount that is set as core value. As the edge amount increases, the gain reaches its upper limit value and becomes constant. By using this characteristic curve for the edge signal 302 by way of example, it is possible to control the correction value.

Although the edge detector 301 is arranged to obtain the edge amount, this detector may be modified to use a high-frequency passing filter. The edge amount shown in FIG. 12 may be replaced with a spectrum quantity to thereby control the correction value.

As for the adaptive controller 304, when letting the internal image signal 12 of the pixel of interest be $I_{in}(x,y)$, the reflected light-adjusted signal 13 be $r(x,y)$, the edge signal 302 be $G_{edge}$ and the gain based on luminance signal 32 be $G_{lm}$ and supposing that the corrected image signal 33 is output, Equation 14 below is given.

$$I_{out}(x,y)=I_{in}(x,y)+G_{edge}\cdot G_{lm}\cdot[r(x,y)-I_{in}(x,y)]\qquad\text{(Equation 14)}$$

In case the luminance as used herein has 256 gradation levels as an example, the gain $G_{lm}$ based on luminance level signal 32 is equal to luminance level signal/256.

Although in Equation 14 the correction amount of the original image is adjusted by the gain, this equation shows one example and this invention is not limited thereto. For instance, the relational expression I=L·r, which is the principle of retinex theory shown in Embodiment 1 and which states that the image I is represented by the product of illumination light L and reflected light r, may be used to add the gain to the reflected light r to thereby adjust the correction amount of the original image. Here, the illumination light L may be calculated based on the output of ambient filter 155 and the output of diffuse filter 153. In the case of the processing based on Equation 14 or in the case of the processing based on the relational expression I=L·r, the adaptive controller 304 of this embodiment is capable of outputting the corrected image signal that takes account of illumination light components.

By enhancing the correction with an increase in illuminance level of outside light in this way, it is possible to prevent the shooting object in an on-screen projected image from decreasing in glossy feeling due to the presence of outside light—usually, sunlight.

Although in the above-stated example the adaptive control using both the luminance level and the edge signal has been explained, adaptive control based on either one of them is also employable, which makes it possible to obtain its corresponding effects. In this case, only one of the gains in Equation 14 may be used, the other of which is unnecessary. Other unneeded parts or units may be excluded from the configuration of FIG. 11.

With the arrangement stated above, it is possible to provide the intended adaptive control that does not emphasize noises in regions with small-amplitude grain-like noises being contained therein. Additionally, adaptive control is implementable for performing strong correction in deference to the illuminance level in cases where outside light is high in intensity and for rendering the correction inoperative in case no outside light is present. Adaptive processing with these approaches combined together is also available.

Accordingly, in accordance with the image processing apparatus of Embodiment 2, it becomes possible to provide the image correction processing that is more preferable than the image correction processing of Embodiment 1.

Embodiment 3

In Embodiments 1 and 2, the projector-used image processing apparatuses have been explained as examples of the constitution of this invention.

In Embodiment 3, an image processing apparatus which is a display panel-integrated display apparatus will be disclosed as an embodiment other than the projector.

FIG. 13 shows an exemplary configuration of the image processing apparatus of this embodiment. In a similar manner to FIG. 1, this apparatus has an input signal processing unit 11 which receives an image signal 10 as input thereto and converts it to an internal image signal 12 by means of a compressed image signal decoder, IP conversion, scaler or the like, for example, and an image corrector 100 which receives the internal image signal 12 as its input signal. It also has an image display unit 500 which receives a corrected image signal 13 as output from the image corrector 100. The image display unit 500 is constituted from a timing controller 14 which processes the corrected image signal 13 as input thereto and generates a display control signal 15 based on display-screen horizontal/vertical sync signals, and a panel 501 which receives the display control signal 15 and visually displays an image in a corresponding pixel area. Examples of the panel 501 include a liquid crystal display (LCD) panel which controls transmission of the light from a backlight on a per-pixel basis, a plasma display panel with per-pixel self-luminous functionality and an organ electro-luminescence (EL) display panel. Viewing persons are expected to directly see video images being displayed on the panel 501.

The image corrector 100 is able to perform more preferable image correction processing when compared to the prior art as has been explained in Embodiment 1. Accordingly, with the arrangement of FIG. 13, it becomes possible to provide the display panel-integrated display apparatus having the technical effects and advantages of Embodiment 1.

In the configuration of FIG. 13, each processing unit which is at pre-stage of the image corrector 100 may be modified to the configuration of Embodiment 2 shown in FIG. 10. In this case also, it is possible to provide a display panel-integrated display apparatus having the effects of Embodiment 2.

Optionally, these display panel-integrated display apparatuses may be arranged to add television tuner functionality to the input signal processor 11 and to replace the input image signal 10 by a TV broadcast signal. In this case, it is possible to provide TV receiver apparatus capable of performing more preferable video image correction processing.

With the above-stated image processing apparatus according to Embodiment 3 of this invention, it becomes possible to provide the display panel-integrated display apparatus having effects and advantages of Embodiment 1 or 2.

Embodiment 4

In this embodiment, an exemplary image processing apparatus which is an imaging device will be disclosed as still another embodiment of this invention.

FIG. 14 shows a configuration of the image processing apparatus of this embodiment.

This image processing apparatus is generally made up of an image-sensing optics unit 400, an image corrector 100 which inputs an image signal as output from the imaging optics unit 400, an image display unit 500 which inputs a corrected image signal 13 as output from the image corrector 100, and a recording/reproducing unit 41 which inputs the corrected image signal 13 and stores an image(s) in a recording medium, such as a nonvolatile memory, optical disk or disc, hard disk drive (HDD) or the like.

Here, the image corrector 100 is similar in configuration to that of Embodiment 1.

A typical example of the imaging optics unit 400 is a charge-coupled device (CCD) image sensor module, which includes an optical lens 401 for collecting light rays, a CCD 402 which generates and outputs an image signal 403 from light rays collected, and a CCD driver 404 which controls the CCD and outputs a video image signal 12.

The image display unit 500 includes a timing controller 14 responsive to receipt of the corrected image signal 13 for generating a display control signal 15 based on display-screen horizontal/vertical sync signals and a panel 501 responsive to receipt of the display control signal 15 for displaying an image in a corresponding pixel area. The image to be displayed at the image display unit 500 may be a real-time sensed image sent from the CCD driver 404 or, alternatively, a playback image of the image or video contents that has been stored in record media by the recording/reproducing unit 41.

The image corrector 100 is able to perform more preferable image correction processing when compared to the prior art as stated in Embodiment 1. Hence, use of the imager apparatus arranged as shown in FIG. 14 makes it possible to apply, to a sensed image also, image correction taking into account the quality of materials of objects in an image.

In addition, it is possible by the recording unit 41 to record the sensed image with the image correction applied thereto. In case the recording unit 41 is arranged to store the correction-completed sensed image in removable record media, such image is playable by another apparatus, thereby enabling persons to view the image which has been corrected by the embodiment technique that is more preferable than the prior art.

By the image display unit 500, it is also possible for a user to watch the sensed image with the image correction applied thereto. The user is able to enjoy texture-improved images with increased viewability. Another merit lies in an ability to make sure that the image of interest has been sensed and stored as an image with its texture being represented more preferably in an authentic-looking manner.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image processing apparatus comprising:
an input unit to input an input image signal; and
an image corrector to correct the input image signal, wherein said image corrector extracts from the input image signal a specular reflection component and a diffuse reflection component and generates a corrected image signal based on a calculation result with respect to the extracted specular reflection component and diffuse reflection component; and said image corrector combines by synthesis the extracted specular reflection component and the extracted diffuse reflection component by applying weighting thereto and generates a corrected image signal based on a synthesis result.

2. The image processing apparatus according to claim 1, wherein said image corrector applies different gain adjustment processing to respective ones of the extracted specular reflection component and the extracted diffuse reflection component before execution of the weighting with respect to these extracted reflection components.

3. An image processing apparatus comprising:
an input unit to input an input image signal; and
an image corrector to correct the input image signal, wherein
said image corrector extracts from the input image signal a specular reflection component and a diffuse reflection component and generates a corrected image signal based on a calculation result with respect to the extracted specular reflection component and diffuse reflection component; and
said image corrector performs first filter processing to obtain an ambient light component from the input image signal, second filter processing to obtain from the input image signal a component containing therein an ambient light component and diffuse reflection component, and third filter processing for obtaining from said input image signal a component containing therein an ambient light component and diffuse reflection component plus specular reflection component and extracts the specular reflection component and the diffuse reflection component based on results of the first to third filter processing.

4. An image processing apparatus comprising:
an input unit to input an input image signal; and
an image corrector to correct the input image signal, wherein
said image corrector extracts from the input image signal a specular reflection component and a diffuse reflection component and generates a corrected image signal based on a calculation result with respect to the extracted specular reflection component and diffuse reflection component; and
said image corrector includes an edge detection unit to detect an edge in the input image and wherein said apparatus changes its image correction processing in accordance with a detection result of said edge detection unit.

5. An image processing apparatus comprising:
an input unit to input an input image signal; and
an image corrector to correct the input image signal, wherein
said image corrector extracts from the input image signal a specular reflection component and a diffuse reflection component and generates a corrected image signal based on a calculation result with respect to the extracted specular reflection component and diffuse reflection component; and
an illuminance sensor to measure an illuminance intensity of outside light, wherein said image corrector changes its image correction processing in accordance with the illumination intensity of the outside light as measured by said illuminance sensor.

6. A projector comprising:
an input unit to input an input image signal;
an image corrector to correct the input image signal;
a light source;
a display element to control transmission or reflection of light rays from the light source in accordance with a corrected image signal generated by said image corrector; and
a projection lens to output light rays transmitted through or reflected from the display element, wherein
said image corrector extracts from the input image signal a specular reflection component and a diffuse reflection component and generates a corrected image signal based on a calculation result with respect to the extracted specular reflection component and diffuse reflection component; and
said image corrector combines by synthesis the extracted specular reflection component and the extracted diffuse reflection component by applying weighting thereto and generates a corrected image signal based on a synthesis result.

7. The projector according to claim 6, wherein said image corrector applies different gain adjustment processing to respective ones of the extracted specular reflection component and the extracted diffuse reflection component before execution of the weighting with respect to these extracted reflection components.

8. A projector comprising:
an input unit to input an input image signal;
an image corrector to correct the input image signal;
a light source;
a display element to control transmission or reflection of light rays from the light source in accordance with a corrected image signal generated by said image corrector; and
a projection lens to output light rays transmitted through or reflected from the display element, wherein
said image corrector extracts from the input image signal a specular reflection component and a diffuse reflection component and generates a corrected image signal based on a calculation result with respect to the extracted specular reflection component and diffuse reflection component; and
said image corrector performs first filter processing to obtain an ambient light component from the input image signal, second filter processing to obtain from the input image signal a component containing therein an ambient light component and diffuse reflection component, and third filter processing to obtain from said input image signal a component containing therein an ambient light component and diffuse reflection component plus specular reflection component and extracts the specular reflection component and the diffuse reflection component based on results of the first to third filter processing.

9. A projector comprising:
an input unit to input an input image signal;
an image corrector to correct the input image signal;
a light source;
a display element to control transmission or reflection of light rays from the light source in accordance with a corrected image signal generated by said image corrector; and
a projection lens to output light rays transmitted through or reflected from the display element, wherein said image corrector extracts from the input image signal a specular reflection component and a diffuse reflection component and generates a corrected image signal based on a calculation result with respect to the extracted specular reflection component and diffuse reflection component; and said image corrector includes an edge detection unit to detect an edge in the input image and wherein said apparatus changes its image correction processing in accordance with a detection result of said edge detection unit.

10. A projector comprising:

an input unit to input an input image signal;

an image corrector to correct the input image signal;

a light source;

a display element to control transmission or reflection of light rays from the light source in accordance with a corrected image signal generated by said image corrector; and a projection lens to output light rays transmitted through or reflected from the display element, wherein said image corrector extracts from the input image signal a specular reflection component and a diffuse reflection component and generates a corrected image signal based on a calculation result with respect to the extracted specular reflection component and diffuse reflection component; and an illuminance sensor to measure an illuminance intensity of outside light, wherein said image corrector changes its image correction processing in accordance with the illumination intensity of the outside light as measured by said illuminance sensor.

* * * * *